(12) United States Patent
Ferrier

(10) Patent No.: US 8,061,992 B2
(45) Date of Patent: Nov. 22, 2011

(54) RIGID HYDRAULIC CONTROL SHAFT AND A CONTROL SYSTEM FOR VARYING THE PITCH OF A PROPELLER

(75) Inventor: Jean-Jacques Ferrier, Velaux (FR)

(73) Assignee: Eurocopter, Marignane Cedex (FR)

( * ) Notice: Subject to any disclaimer, the term of this patent is extended or adjusted under 35 U.S.C. 154(b) by 492 days.

(21) Appl. No.: 12/394,373

(22) Filed: Feb. 27, 2009

(65) Prior Publication Data

US 2009/0214344 A1 Aug. 27, 2009

(30) Foreign Application Priority Data

Feb. 27, 2008 (FR) ...................................... 08 01073

(51) Int. Cl.
*B63H 3/08* (2006.01)
*B64C 11/38* (2006.01)

(52) U.S. Cl. .................... 416/157 R; 416/147; 416/154; 416/168 A

(58) Field of Classification Search .............. 416/157 R, 416/157 A, 157 B, 1, 27, 147, 154, 168 A
See application file for complete search history.

(56) References Cited

U.S. PATENT DOCUMENTS

| | | | | |
|---|---|---|---|---|
| 1,893,612 A | * | 1/1933 | Caldwell | 416/48 |
| 1,939,229 A | * | 12/1933 | Schmitthenner | 416/157 R |
| 2,374,588 A | * | 4/1945 | Doran | 60/425 |
| 2,661,807 A | * | 12/1953 | Fielding | 416/157 R |
| 2,670,805 A | * | 3/1954 | Nichols | 416/61 |
| 2,850,103 A | * | 9/1958 | Pearl | 416/157 R |
| 2,855,804 A | * | 10/1958 | Euler | 475/48 |
| 3,115,937 A | | 12/1963 | Biermann | |
| 4,190,941 A | | 3/1980 | Charron | |
| 4,792,281 A | * | 12/1988 | Coleman | 416/156 |
| 5,364,231 A | | 11/1994 | Eick et al. | |
| 6,261,062 B1 | * | 7/2001 | Amerling et al. | 416/147 |
| 2002/0034899 A1 | * | 3/2002 | Kim | 440/5 |
| 2009/0120710 A1 | * | 5/2009 | Hasegawa et al. | 180/365 |
| 2009/0145124 A1 | * | 6/2009 | Irikura | 60/487 |

FOREIGN PATENT DOCUMENTS

EP 0409552 1/1991
GB 2117281 10/1983

* cited by examiner

*Primary Examiner* — Chris Chu
(74) *Attorney, Agent, or Firm* — Brooks Kushman P.C.

(57) ABSTRACT

A rigid hydraulic control shaft for conveying a fluid from a hydraulic valve to a hydraulic chamber of a propeller comprises a main segment. The main segment has a hollow rigid outer tube and a solid rigid inner bar. The inner bar has an outer periphery and at least one longitudinal groove disposed along the outer periphery. The outer periphery is configured to move in rotation and translation with an inner periphery of the outer tube. The main segment is configured to move in rotation and in translation with a piston disposed adjacent to the hydraulic chamber.

14 Claims, 1 Drawing Sheet

RIGID HYDRAULIC CONTROL SHAFT AND A CONTROL SYSTEM FOR VARYING THE PITCH OF A PROPELLER

Priority is claimed to French Patent Application No. FR 08 01073, filed on Feb. 27, 2008, the entire disclosure of which is incorporated by reference herein.

The present invention relates to a rigid hydraulic control shaft for varying a pitch of blades of a propeller. It also relates to a control system for varying a pitch of a propeller and making use of said control shaft. The invention thus lies in the narrow technical field of hydraulic control shafts for propellers.

BACKGROUND

It is conventional to use propellers that are arranged on a lift surface of an aircraft in order to propel it. By expelling the air passing through it, each propeller creates a propulsive or tractive force suitable for causing the aircraft to move forwards in translation. Thus, a propeller generally comprises a hub secured to a plurality of blades, the hub being covered by a conical fairing commonly called a "spinner".

In the early days of aviation, propellers were provided with a plurality of fixed-pitch blades, the blades and the hub forming a single block. Such propellers are therefore referred to as "fixed-pitch propellers". The pitch of the blades was consequently set permanently at a value that was determined at the time the propeller was fabricated. Depending on the intended mission, a pilot could choose to fit a propeller of small pitch for enhanced climbing, or a propeller of large pitch for enhanced cruising flight. In addition to it not being possible to have a propeller that is optimized for all missions, it will readily be understood that such propellers present difficulties in that the entire propeller needs to be changed in order to go from one configuration to another.

A significant improvement to that type of propeller is known. It comprises a second type of propeller known as a propeller of pitch that is variable on the ground. The pitch of the blades of a propeller can thus be adjusted on the ground. By unlocking a blade clamping collar, the blades can be pivoted into the desired position in order to change the pitch. Compared with the first type of propeller, the second type avoids the need to remove the propeller. Such adjustment, however, can clearly not be performed in flight.

A third type of propeller, known as a "variable pitch propeller" has also been implemented. The aircraft then has a system for controlling pitch variation that enables the pitch of the propeller blades to be changed in flight. Conventionally, such a pitch variation control system has a hydraulic pump that is activated by the pilot via a control, a hydraulic chamber provided under the conical spinner of the propeller, and a piston associated with the blades via a rod.

Depending on the order issued by the pilot, the pump injects fluid into the hydraulic chamber via flexible pipe. The resulting change of pressure in the hydraulic chamber causes the piston to move. The blades are then caused to turn about their pitch variation axes by the piston. That third type of propeller thus enables blade pitch to be varied while in flight so as to go from a small pitch on takeoff to a large pitch while cruising.

It should also be observed that in the event of the engine installation that drives a propeller in rotation breaking down, the blades can be oriented in such a manner as to minimize their relative wind resistance and thus minimize drag. This is referred to as "feathering" the propeller. Nevertheless, this third type of propeller is not totally satisfactory. If, during flight, the pilot pulls up the nose, the speed of rotation of the propeller drops and the aircraft loses speed.

Consequently, a fourth type of propeller has been implemented to maintain optimized propulsion, or optimized traction, as a function of the orientation of the propeller, this fourth type being referred to as a "constant speed" propeller. As with the third type, a hydraulic device is provided to vary the pitch of the propeller blades in flight. Furthermore, the pilot now controls a throttle to adjust the power delivered by the aircraft engine installation. Regulator means are implemented and control both the power from the engine installation and the pitch of the blades so as to maintain the speed of rotation of the propeller constant. Optionally, the aircraft includes a propeller control used by the pilot to set said speed of rotation of the propeller.

The pitch variation control system used by the third and fourth types of propeller is effective. Nevertheless, it can be difficult or even impossible to implement it. If the hydraulic fluid feed needs to pass via the power transmission shaft driving the propeller in rotation, then it is not possible to use a flexible pipe, which is needed to perform a rotary movement.

Similarly, for safety reasons, it can be necessary to duplicate pitch variation systems, which can be difficult. Consequently, the assembly comprising a pump and a flexible pipe has been replaced by a hydraulic slide valve and a longitudinally-pierced bar. The bar is constrained to rotate with the propeller, and it is fed via the hydraulic valve. The valve then fills the longitudinal borehole in the bar with fluid, e.g. oil, so as to cause the piston in the propeller to move and vary the pitch of the propeller's blades. Nevertheless, modern techniques enable boreholes to be made in bars of small dimensions only, with the piercing of bars of large dimensions leading to completely unacceptable departures from alignment. Conventionally, the person skilled in the art thus machines bars of small dimensions and assembles such bars together by welding them in pairs, the junction zones being covered by sleeves. This solution is burdensome and difficult to implement. Furthermore, it is not possible to pierce a large number of channels in a bar of small dimensions, thus limiting the quantity of fluid that can be conveyed by the transmission shaft and preventing the control system from being made redundant.

SUMMARY OF THE INVENTION

An aspect of the present invention is to provide a hydraulic control shaft that is easily machined and suitable for conveying a large quantity of fluid to a mechanical member.

The present invention provides a rigid hydraulic control shaft that has at least a main segment of the control shaft including a rigid outer tube that is hollow and a rigid inner bar that is solid. An outer periphery of the inner bar is secured to move in rotation and in translation with an inner periphery of the outer tube, and the inner bar includes at least one longitudinal groove formed along the entire length of its outer periphery in the main segment of the shaft.

In order to be secured to each other, the outlet tube is heated, thereby artificially increasing its diameter by expansion, while on the contrary the inner bar is cooled. The grooved inner bar is then engaged in the outer tube. On returning to normal conditions, the outer tube contracts as it cools, while the inner bar expands as it warms. Consequently, the inner bar is clamped inside the outer tube. The inner bar and the outer tube become constrained to move together both in rotation and in translation. It is found that the control shaft is then easy to make, since it is easy to provide one or more grooves in the outer periphery of the inner bar of the control shaft. There is no longer any need to pierce subassemblies and to interconnect the subassemblies by leaktight means.

The hydraulic control shaft of the invention can then convey a fluid via its grooves from a hydraulic valve to a hydraulic chamber of a propeller in order to cause the pitch of the blades of said propeller to vary. In addition, since the control shaft is rigid, it can easily perform rotary motion. Furthermore, the control shaft may have one or more additional characteristics as mentioned below.

Advantageously, a first and a second elongate weld are made on either side of each groove, e.g. rectilinear grooves, so as to secure the inner bar to the outer tube. Welding serves to guarantee that the fluid contained in one groove will not leak out therefrom and fill another groove. Furthermore, the outer tube has one radial inlet orifice per groove to put the groove into communication with an outside environment, e.g. a hydraulic slide valve.

In a first embodiment, the control shaft comprises a main segment only, the inner bar being arranged entirely inside the outer tube. The outer tube then optionally includes one radial outlet orifice per groove in order to put the groove into communication with an outside environment, e.g. the hydraulic chamber in a propeller. In this context, each groove has first and second ends, and said first and second ends are closed by respective plugs.

In a second embodiment, the rigid control shaft comprises a main segment and a secondary segment. In the main segment, the control shaft is provided with a rigid outer tube that is hollow and with a rigid inner bar that is solid, an outer periphery of the inner bar being secured to move in rotation and in translation with an inner periphery of the outer tube, the inner bar having at least one longitudinal groove formed along the entire length of its outer periphery in the main segment of the shaft.

In contrast, in the secondary segment, the inner bar is provided with one longitudinal borehole per groove, a first end zone of said longitudinal borehole opening out into a first end of said corresponding groove situated in the main portion of the control shaft. The outer tube then covers firstly all of the inner bar in the main segment of the control shaft, and secondly only part of the inner bar in the secondary segment. There is no need to cover the inner bar in the secondary segment with the outer tube insofar as the outer periphery of the inner bar does not have any grooves that need to be covered in the secondary segment. Nevertheless, in order to guarantee a good sealing, it is advantageous for part of the inner bar to be covered in the secondary segment. For this purpose, the rigid hydraulic control shaft advantageously includes a sleeve covering the outer tube and a part of the inner bar in the secondary segment.

The second embodiment presents an advantage when the free end of the control shaft needs to be machined, e.g. to be given a screw thread. The secondary segment of the hydraulic control shaft is then machined. In this second embodiment, the outer tube has one radial inlet orifice per groove to make each groove communicate with an outside environment, the inner bar having one radial outlet orifice per borehole. The radial inlet orifice enables a groove to be fed with a fluid and then enables the corresponding borehole to be fed, the fluid exiting from the hydraulic control shaft via the radial outlet orifice.

The present invention also provides a control system for varying the pitch of the blades of a propeller by implementing the hydraulic control shaft of the invention. The control system for varying the pitch of the blades of a propeller comprises a piston secured to a projection from each blade so as to be constrained to rotate with the blades about a longitudinal axis of the propeller. Furthermore, since the piston is fastened to a projection from each blade, movement of the piston in translation along the longitudinal axis generates rotation of the blades about their respective pitch variation axes. The piston is adjacent to a hydraulic chamber so that the pressure that exists in the hydraulic chamber can move the piston in translation along the longitudinal axis. The control system comprises a rigid hydraulic control shaft of the invention as described above and a hydraulic valve for adjusting the pressure that exists in said hydraulic chamber. The hydraulic valve can inject a fluid into the hydraulic control shaft in order to feed the hydraulic chamber located in the spinner of the propeller. Furthermore, the control shaft is advantageously secured to move in translation with the piston along the longitudinal axis, by conventional means such as an anchoring peg. Finally, the control system may be provided with a return spring for the piston.

BRIEF DESCRIPTION OF THE DRAWINGS

The invention and its advantages appear in greater detail in the context of the following description of embodiments given by way of illustration with reference to the accompanying figures, in which.

DETAILED DESCRIPTION

Figure 1:
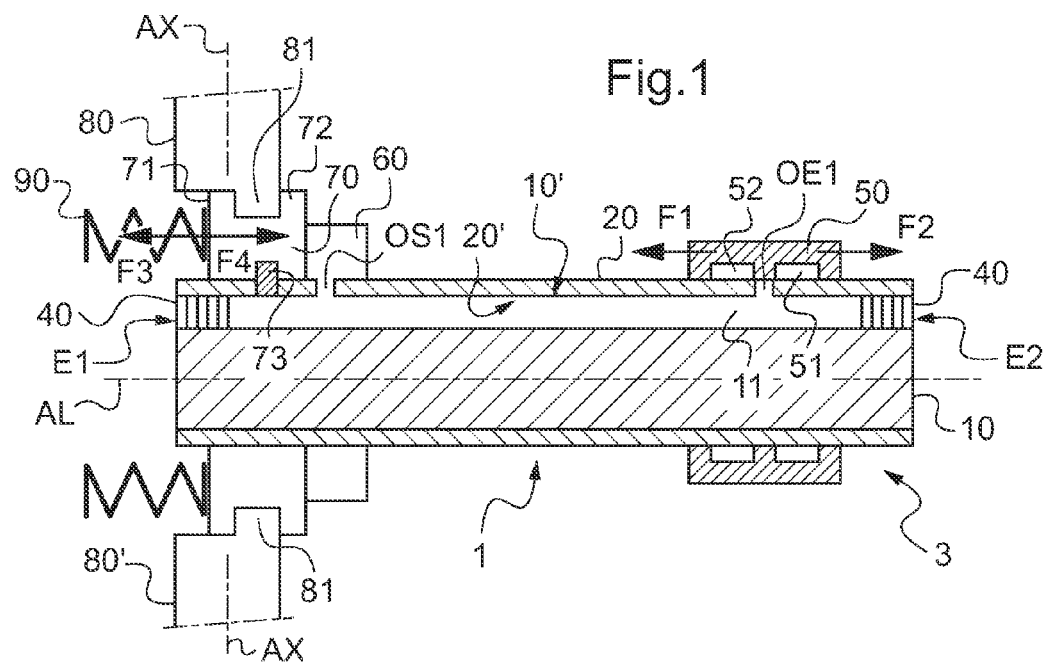
FIG. 1 is a longitudinal section of a rotary hydraulic control shaft, in a first embodiment.

FIG. 1 is a diagrammatic longitudinal section of a hydraulic control shaft 3 and of the propeller pitch variation control system in a first embodiment. Whatever the embodiment, in its main segment 1, the control shaft 3 comprises a rigid inner bar 10 that is solid and a rigid outer tube 20 that is hollow. The inner bar 10 and the outer tube 20 are cylindrical in shape and coaxial, both extending along their longitudinal axis AL. In order to make the control shaft 3, an operator begins by forming at least one longitudinal groove 11 in the outer periphery 10' of the inner bar 10. Each groove 11 runs along the entire length of the main segment 1, being rectilinear and parallel to the longitudinal axis AL.

Figure 2:
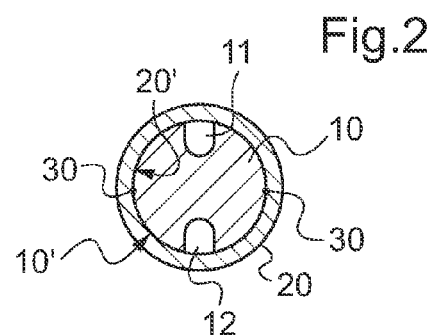
FIG. 2 is a radial section of a rotary hydraulic control shaft, in the first embodiment.

The variant shown in FIG. 1 has a single groove 11, whereas the variant shown diagrammatically in FIG. 2 has first and second grooves 11 and 12.

Once the inner bar 10 has been grooved, an operator clamps it inside the outer tube 20, e.g. by shrinking the tube onto it. The outer periphery 10' of the inner bar 10 is then secured to the inner periphery 20' of the outer tube 20 so that they are constrained to move together in rotation about the longitudinal axis AL and in translation along said longitudinal axis AL. In order to avoid leaks, particularly when the main segment 1 of the control shaft 3 has a plurality of grooves, it is advantageous to make first and second longitudinal welds on either side of each groove, e.g. by laser. With reference to FIG. 2, if the inner bar 10 has first and second grooves 11 and 12, then two longitudinal welds 30 suffice.

In the first embodiment of the invention as shown in FIG. 1, the control shaft 3 comprises solely a main segment 1. The inner bar 10 is then arranged completely within the outer tube 20 and does not project from said outer tube 20. In addition, the outer tube 20 has one radial inlet orifice OE1 and one radial outlet orifice OS1 per groove 11, these radial orifices passing through the outer tube 20 to enable each groove 1 to open to the outside in a radial direction.

Consequently, at least in the present example, there is no need for the first and second ends E1 and E2 of each groove to be open. Thus, the first and second ends E1 and E2 are closed by respective plugs 40. In addition to the first embodiment of the control shaft 3, FIG. 1 also shows a control system for varying the pitch of the blades 80, 80' of a propeller. This control system comprises an annular hydraulic chamber 60 fed with a fluid, e.g. oil, via the radial outlet orifice OS1 of the control shaft 3. In addition, the control system has a piston 70 that surrounds the control shaft 3, being secured thereto both in rotation and in translation by a peg 73. The piston 70 is firstly adjacent to the hydraulic chamber 60 and secondly fastened to respective projections 81 from the first and second propeller blades 80 and 80'. The piston can then turn about the longitudinal axis AL together with the blades, and it can also move in translation along said longitudinal axis AL. Furthermore, the control system possesses a hydraulic slide valve 50 having at least a first stage provided with a feed chamber 51 and a return chamber 52 that are both annular. This stage is connected to flight controls (not shown).

When the first stage is moved by the flight controls along a first arrow F1, the feed chamber 51 is in register with the inlet orifice OE1 of the groove 11 in the control shaft 3. Given the pressure that exists in said feed chamber 51, the fluid it contains spreads into the groove 11 and then exits via the radial outlet orifice OS1 of the control shaft 3. The pressure in the hydraulic chamber 60 thus increases significantly. The hydraulic chamber 60 then exerts a force on the piston 70, which moves along the longitudinal axis AL in the direction of a third arrow F3. The piston 70 in turn pushes against the projections 81 from the blades, thereby enabling them to turn about their respective pitch variation axes AX. Furthermore, since the piston 70 is secured to the control shaft 3 via the peg 73 so that they move together in translation, the control shaft 3 also moves along the longitudinal axis AL. Consequently, the inlet orifice OE1 ends up no longer being in register with the feed chamber 51. The control system is once more stabilized at a given pitch value.

Assuming that movement of the hydraulic valve in the direction of the first arrow F1 causes the pitch of the propeller blade to increase, it will be understood that it is appropriate also to be able to reduce the pitch.

The flight controls then move the first stage of the hydraulic valve 50 in the direction of a second arrow F2 so as to put the inlet orifice OE1 of the control shaft 3 into communication with the return chamber 52 of the hydraulic valve 50. The control system also has a return spring 90 urging the piston 70 back along the direction of a fourth arrow F4. Since the pressure that exists in the return chamber is low, the spring pushes the piston 70, which then moves along the longitudinal axis in the direction of the fourth arrow F4. This movement is made possible insofar as the fluid contained in the hydraulic chamber 60 is expelled towards the groove 11 by passing through the radial outlet orifice OS1, and then towards the return chamber 52 by passing through the radial inlet orifice OE1. As it moves, the piston 70 entrains the projections 81, thereby enabling the pitch of the blades to be reduced. Furthermore, the piston 70 entrains the control shaft 3 until its radial inlet orifice OE1 is no longer in register with the return chamber 52. Consequently, the control shaft 3 enables the pressure that exists in the internal chamber 60 to be adjusted by putting it into communication with the hydraulic valve 50 via its groove 1 and its radial inlet and outlet orifices OE1 and OS1.

Figure 3:
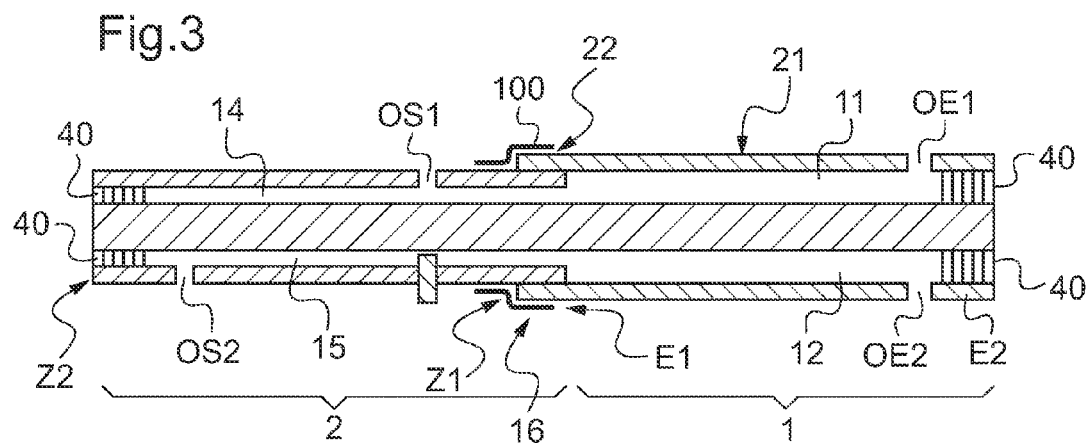
FIG. 3 is a longitudinal section of a rotary hydraulic control shaft, in a second embodiment. Elements present in more than one of the figures are given the same references in each of them.

FIG. 3 shows a second embodiment of the invention. In this embodiment, the control shaft 3 comprises a main segment 1 and a secondary segment 2. As for the first embodiment, in the main segment 1, the control shaft 3 is made up in particular of an inner bar 10 clamped in an outer tube 20. The inner bar 3 is provided with at least one groove in its outer periphery, and with first and second grooves 11 and 12 in the variant shown. The inner bar 10 also extends in the secondary segment 2 and passes along the entire length of the secondary segment 2. Nevertheless, within the secondary segment 2, the inner bar does not have any groove in its outer periphery 10'. On the contrary, in the secondary segment 2, the inner bar 10 is provided with one longitudinal borehole per groove, i.e. first and second longitudinal boreholes 14 and 15 in the example shown.

Each longitudinal borehole has first and second end zones Z1 and Z2, with the first end zone Z1 of a longitudinal borehole 14, 15 opening out into the first end E1 of the corresponding groove 11, 12. Consequently, each longitudinal borehole communicates with the corresponding groove, and vice versa.

In addition, the outer tube 20 extends in part into the secondary segment 2. Thus, the outer tube has a main portion 21 occupying the entire main segment 1, with the main portion 21 being extended by a secondary portion 22 that covers part of the inner bar 10 in the secondary segment 2. To guarantee sealing for the secondary segment 2, a sleeve 100 is placed over the secondary portion 22 and over part of the inner bar 10, and more precisely over the end part 16 of the inner bar that is situated beside the secondary portion 22 of the outer tube 20. Furthermore, in the main segment 1, the outer tube has first and second radial inlet orifices OE1 and OE2 that open out respectively into the first and second grooves 11, 12.

Likewise, in the secondary segment 2, the inner bar is provided with first and second radial outlet orifices OS1 and OS2 that open out respectively from the first and second boreholes 14, 15, the first and second boreholes 14 and 15 being in hydraulic communication with the first and second grooves 11 and 12, respectively. Since the control shaft 3 has inlet and outlet orifices that are radial, there is no need for it to have longitudinal orifices. Consequently, the second ends E2 of the first and second grooves 11 and 12, and also the second end zones Z2 of the first and second boreholes are closed by means of plugs 40.

It should be observed that the variant shown in FIG. 3 has a control shaft that is provided with two distinct hydraulic paths. This configuration is particularly useful in a redundant control system for varying the pitch of propeller blades. Such a redundant control system is then provided with a two-stage hydraulic valve, with two interconnected pistons, and with two distinct hydraulic chambers. Each hydraulic chamber is then connected to one stage of the valve via one of the hydraulic paths in the control shaft made up of a groove and optionally also of a borehole, depending on the embodiment selected. Thus, a leak from one hydraulic chamber or from one path is not catastrophic.

Naturally, the present invention can be subjected to numerous variants as to its implementation. Although several embodiments are described above, it will readily be understood that it is not conceivable to identify exhaustively all possible embodiments. It is naturally possible to envisage replacing any of the means described by equivalent means without thereby going beyond the ambit of the present invention.

What is claimed is:

1. A rigid hydraulic control shaft for conveying a fluid from a hydraulic valve to a hydraulic chamber of a propeller, the control shaft comprising:
a main segment having a hollow rigid outer tube and a solid rigid inner bar, the inner bar having an outer periphery and at least one longitudinal groove disposed along the outer periphery, wherein the outer periphery is configured to move in rotation and translation with an inner periphery of the outer tube, and the main segment is configured to move in rotation and in translation with a piston disposed adjacent to the hydraulic chamber.

2. The control shaft as recited in claim 1, wherein the at least one longitudinal groove is rectilinear.

3. The control shaft as recited in claim 1, wherein the at least one longitudinal groove has a first and a second elongate weld on either side of the at least one groove, the first and second elongate welds fixing the inner bar to the outer tube.

4. The control shaft as recited in claim 1, wherein the outer tube includes at least one radial inlet orifice enabling the at least one longitudinal groove to communicate with an outside environment.

5. The control shaft as recited in claim 1, wherein the inner bar is disposed entirely inside the outer tube.

6. The control shaft as recited in claim 5, wherein the outer tube includes at least one radial outlet orifice enabling the at least one groove to communicate with an outside environment.

7. The control shaft as recited in claim 5, wherein the at least one longitudinal groove has a first end and a second end, wherein the first and the second ends are each closed by a respective plug.

8. A control shaft as recited in claim 1, further comprising a secondary segment, wherein the inner bar extends from the main segment through the secondary segment, the inner bar having at least one longitudinal borehole in the secondary segment, the longitudinal borehole having a first end zone communicating with a first end of the respective at least one longitudinal groove.

9. A control shaft as recited in claim 8, wherein the outer tube entirely covers the inner bar in the main segment and partly covers the inner bar in the secondary segment.

10. A control shaft as recited in claim 8, wherein the outer tube includes at least one radial inlet orifice enabling the at least one longitudinal groove to communicate with an outside environment and the inner bar includes at least one radial outlet orifice.

11. A control shaft as recited in claim 8, further comprising a sleeve covering a portion of the outer tube in the main segment and covering a portion of the inner bar in the secondary segment.

12. A control system configured to vary a pitch of at least one blade of a propeller, the system comprising:
a piston fastened to a projection of the at least one blade and configured to move in rotation with the blade about a longitudinal axis of the propeller;
a hydraulic chamber adjacent to the piston, a pressure in the hydraulic chamber configured to move the piston in translation along the longitudinal axis;
a hydraulic valve configured to adjust the pressure in the hydraulic chamber; and
a rigid hydraulic control shaft configured to convey a fluid from the hydraulic valve to the hydraulic chamber and configured to move in translation and rotation with the piston, the control shaft having a main segment having a hollow rigid outer tube and a solid rigid inner bar, the inner bar having an outer periphery and at least one longitudinal groove disposed along the outer periphery, the outer periphery configured to move in rotation and translation with an inner periphery of the outer tube.

13. The control system as recited in claim 12, wherein the control shaft is configured to move in translation with the piston along the longitudinal axis.

14. The control system as recited in claim 12, further comprising a return spring configured to return the piston.

* * * * *